United States Patent
Trejo

(10) Patent No.: US 7,980,381 B2
(45) Date of Patent: Jul. 19, 2011

(54) ALIGNMENT MECHANISM FOR FOOD PRODUCTS

(75) Inventor: Joaquin Alverde Trejo, Municipio de Metepec (MX)

(73) Assignee: Grupo Bimbo, S.A.B. de C.V., Mexico D.F. (MX)

( * ) Notice: Subject to any disclaimer, the term of this patent is extended or adjusted under 35 U.S.C. 154(b) by 326 days.

(21) Appl. No.: 12/221,982

(22) Filed: Aug. 8, 2008

(65) Prior Publication Data

US 2009/0090600 A1     Apr. 9, 2009

(30) Foreign Application Priority Data

Oct. 3, 2007 (MX) .................. MX/A/2007/012249

(51) Int. Cl.
    *B65G 47/12*     (2006.01)
(52) U.S. Cl. ........ 198/443; 198/444; 198/445; 198/455; 198/750.1
(58) Field of Classification Search .............. 198/443, 198/444, 445, 452, 454, 455, 750.1; 209/539, 209/657

See application file for complete search history.

(56) References Cited

U.S. PATENT DOCUMENTS

| | | | | |
|---|---|---|---|---|
| 4,173,276 A | * | 11/1979 | Raudat et al. | .................. 198/437 |
| 5,489,019 A | * | 2/1996 | DiNanno et al. | ........... 198/752.1 |
| 5,768,860 A | * | 6/1998 | Weaver | ............................ 53/543 |
| 6,814,211 B2 | * | 11/2004 | Yunker et al. | ............. 193/25 FT |
| 6,854,585 B2 | * | 2/2005 | Brooks et al. | .................. 198/394 |
| 7,128,217 B2 | * | 10/2006 | Henry | ............................ 209/643 |
| 7,237,668 B2 | * | 7/2007 | Gamberini | ................. 198/369.1 |
| 7,360,637 B1 | * | 4/2008 | Wyman et al. | ............. 198/419.1 |
| 7,743,927 B2 | * | 6/2010 | Svatek et al. | .................. 209/656 |
| 7,784,599 B2 | * | 8/2010 | Balleza et al. | ................ 198/432 |
| 2007/0125239 A1 | | 6/2007 | Balleza et al. | |
| 2009/0031946 A1 | | 2/2009 | Alverde Trejo | |
| 2009/0060701 A1 | | 3/2009 | Trejo | |

* cited by examiner

*Primary Examiner* — Douglas A Hess
(74) *Attorney, Agent, or Firm* — Brinks Hofer Gilson & Lione

(57) ABSTRACT

An apparatus and method are described for aligning food products in a plurality of rows for feeding a subsequent processing operation in a production process. The apparatus includes first and second continuous belt conveyors adjacent to each other, a dispensing plate operable to delay movement of the plurality of food products and cluster the food products together. The food products are then periodically distributed onto the second continuous belt conveyor, improving dispersion of the food products thereon. Guide fingers that extend and retract over the second continuous belt conveyor contact and displace the food products into rows within channels formed by longitudinal members extending over at least a portion of the second continuous belt conveyor. The rows of food products are then conveyed to the next processing operation.

22 Claims, 11 Drawing Sheets

US 7,980,381 B2

ALIGNMENT MECHANISM FOR FOOD PRODUCTS

CLAIM OF PRIORITY

This application claims priority under 35 USC §119 to Mexican Patent Application Serial No. MX/a/2007/012249, filed on Oct. 3, 2007, the entire contents of which are hereby incorporated by reference.

TECHNICAL FIELD

This invention relates to a continuous production process for uniformly distributing food products upon an endless or continuous belt or band in a predetermined manner, and more particularly to a continuous production process operable to distribute bakery or confectionery products on a continuous belt or band in an alignment appropriate for a subsequent processing operation of the process.

SUMMARY

It is an object of the present disclosure to provide an apparatus having an endless or continuous belt or band (referred to hereinafter as "continuous belt") and operable to align a plurality of food items being transported on the endless belt in a desired configuration in preparation for a subsequent operation of a process. In some implementations, the products are bakery or confectionery products (referred to hereinafter as "bakery products") and are aligned on the continuous belt in a predetermined configuration that facilitates a subsequent processing stage prior to a packaging operation.

Another objective of the present disclosure is to provide an apparatus having the attributes identified above with a simplified design and efficient operation to achieve the desired functionality, including uniform handling and distribution of the bakery products on the continuous belt or band and the transportation of the bakery products to a cutting process.

An additional object of the invention is to provide an apparatus for the handling, distribution, and alignment of the bakery products on the moving, continuous belt that delicately handles the bakery products prior to a subsequent processing operation, such as a longitudinal cutting operation, prior to packing the bakery products.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
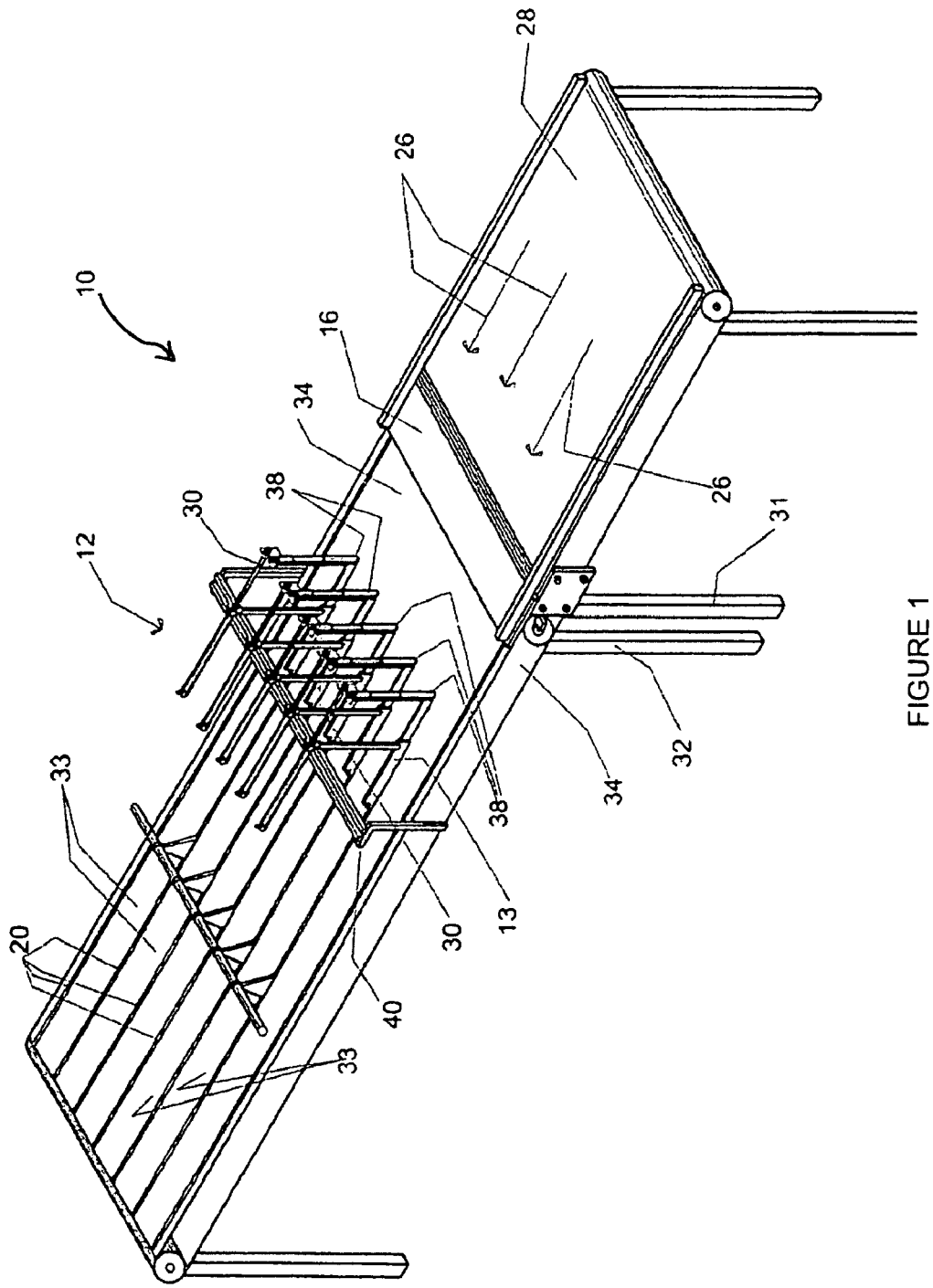
FIG. 1 is a perspective view of an apparatus operable to convey and align bakery products randomly disposed on a continuous belt of the apparatus.
Figure 2:
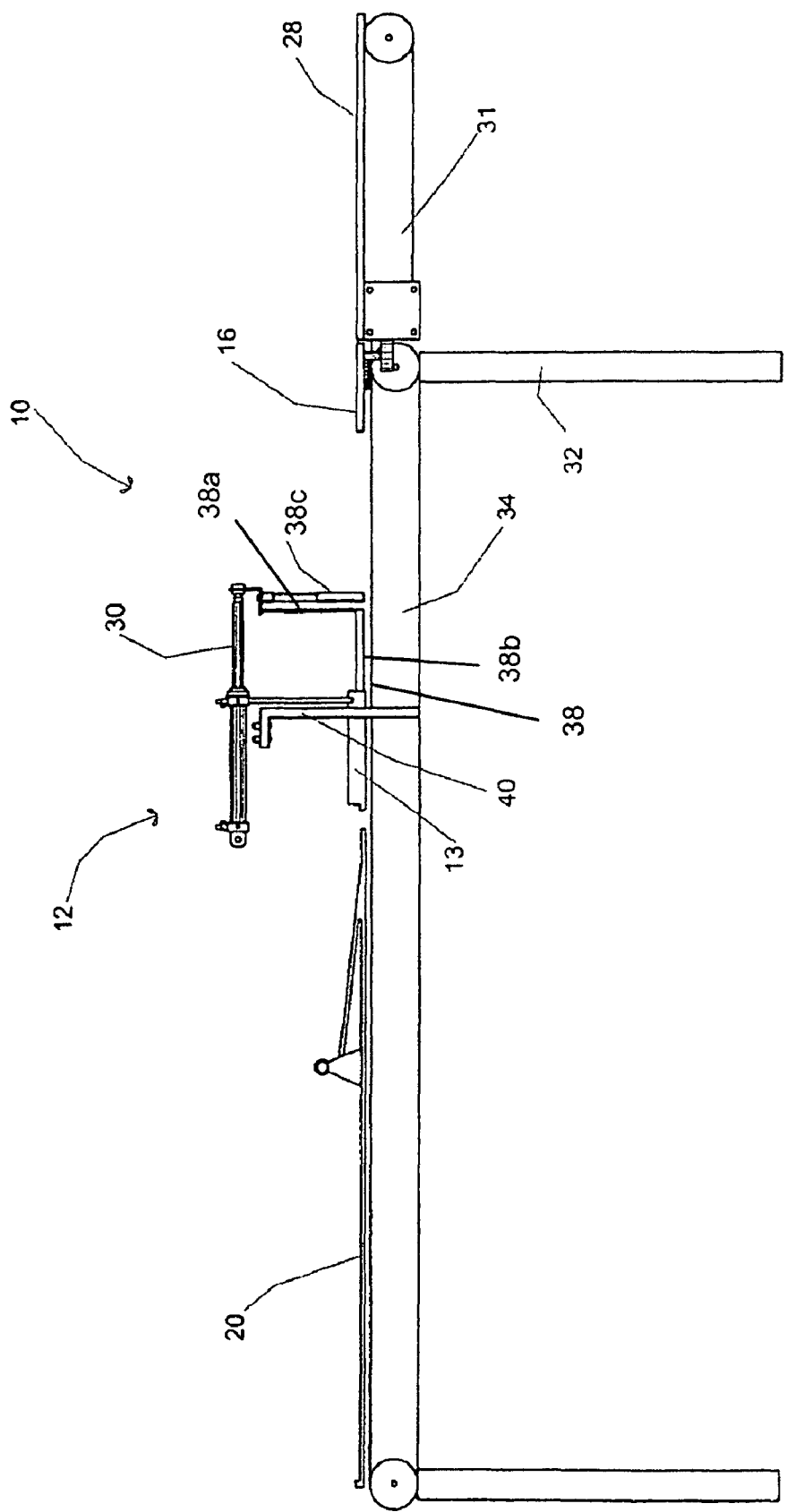
FIG. 2 shows a side view of the apparatus of FIG. 1.
Figure 3:
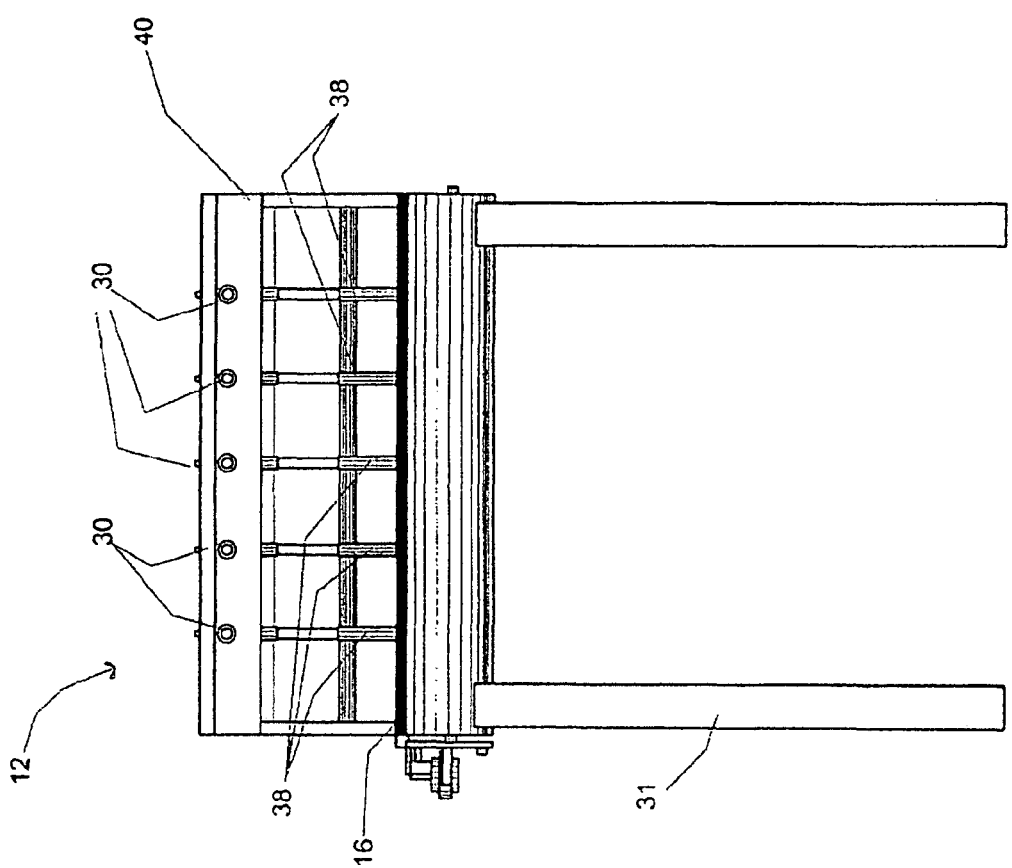
FIG. 3 shows a front elevation view of the apparatus of FIG. 1.
Figure 4:
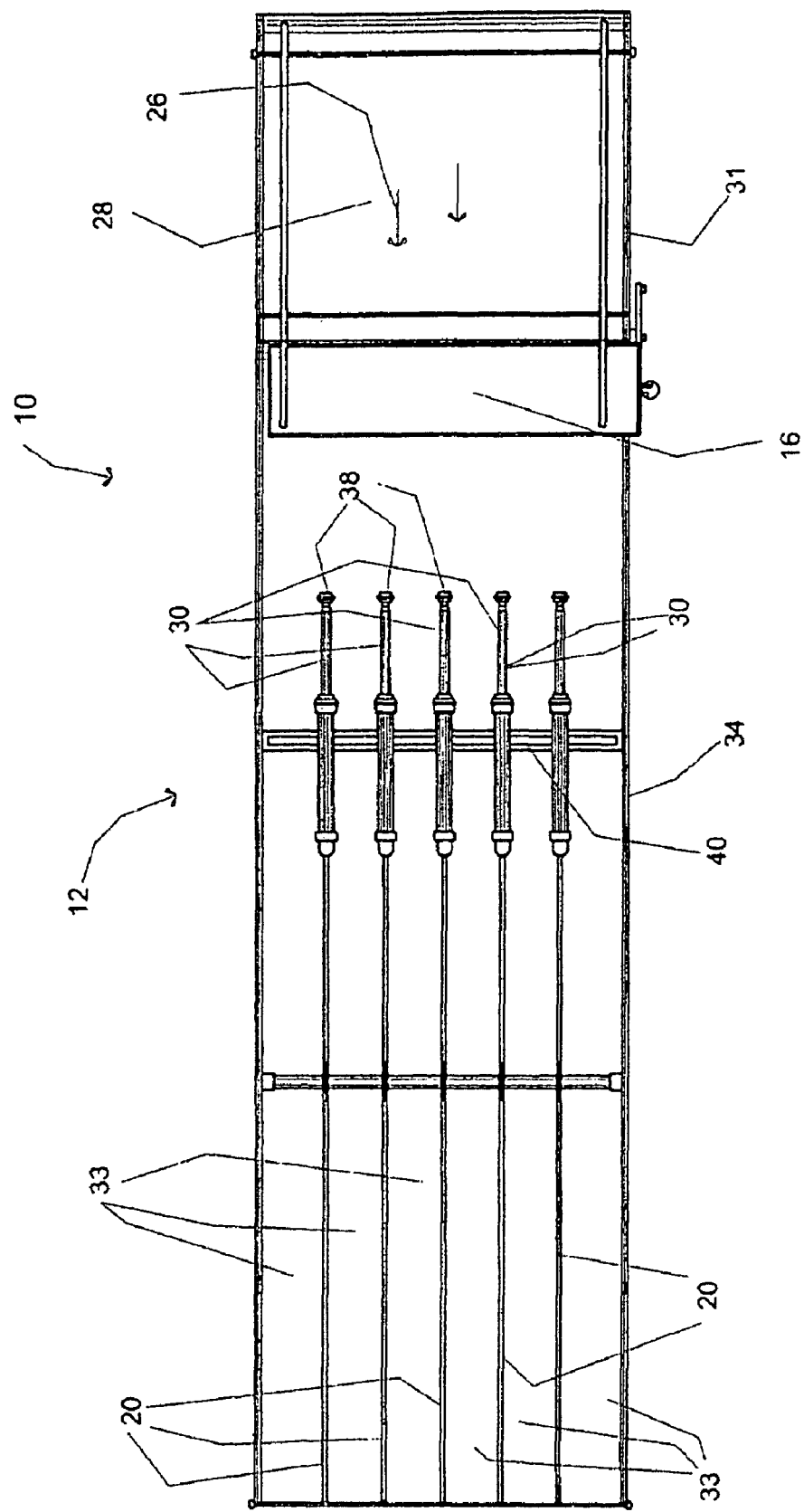
FIG. 4 shows a top view of the apparatus of FIG. 1.
Figure 8:
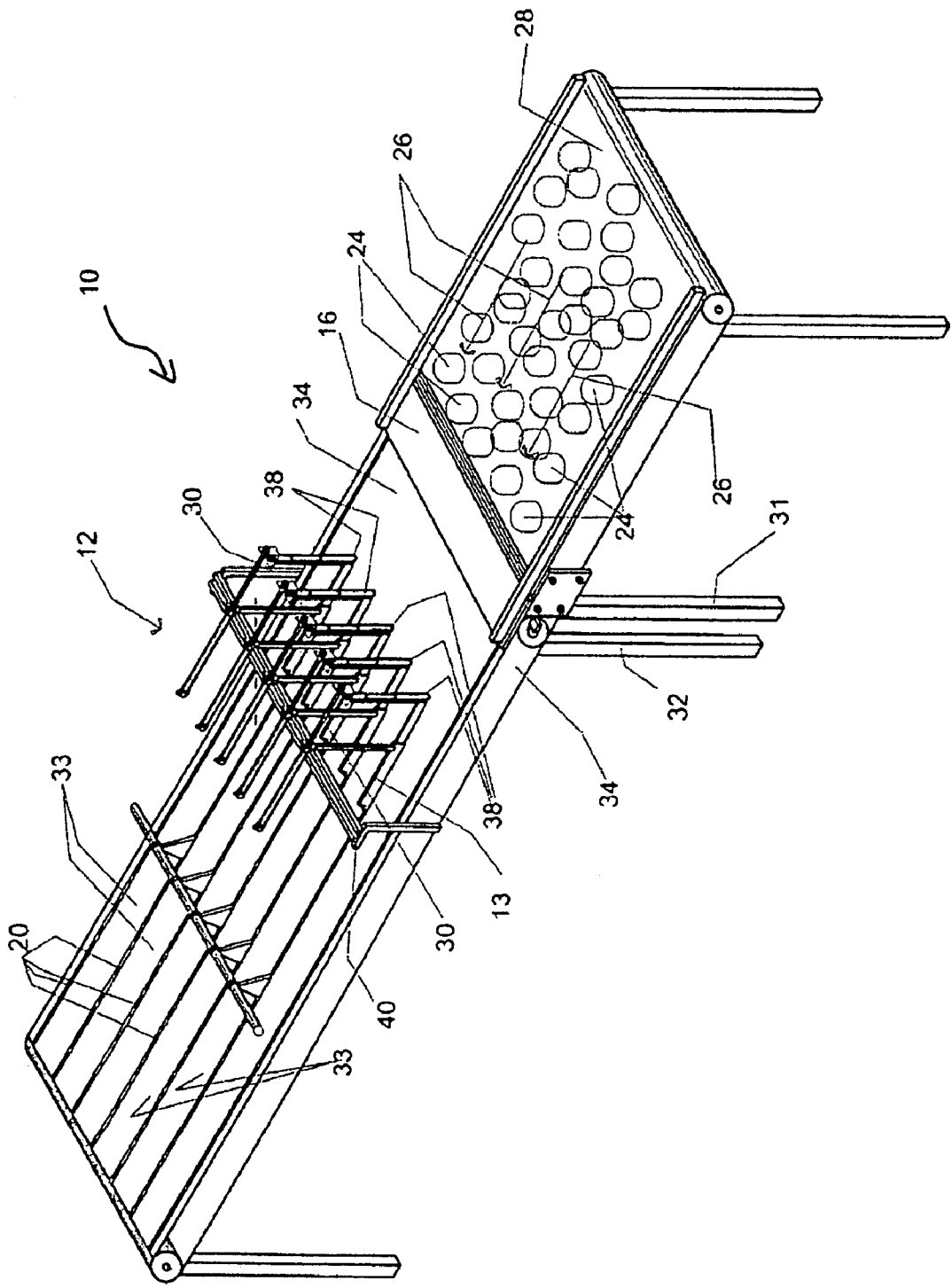
FIG. 8 is a perspective view of the apparatus shown in FIG. 1 having a plurality of round bakery products being transported by the continuous belt.
Figure 9:
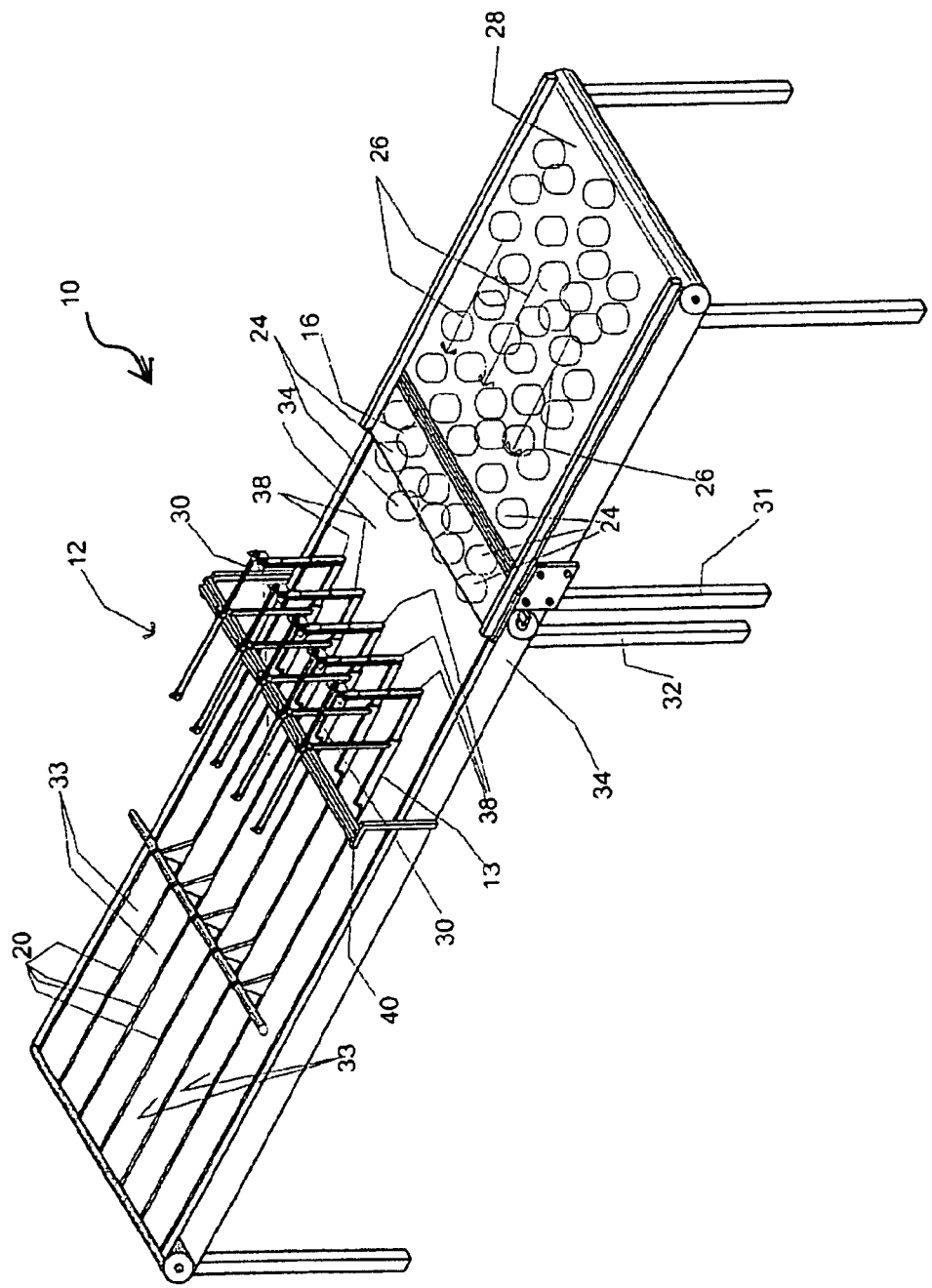
FIG. 9 is a perspective view of the apparatus of FIG. 1 showing the bakery products being distributed by a distributing plate.
Figure 10:
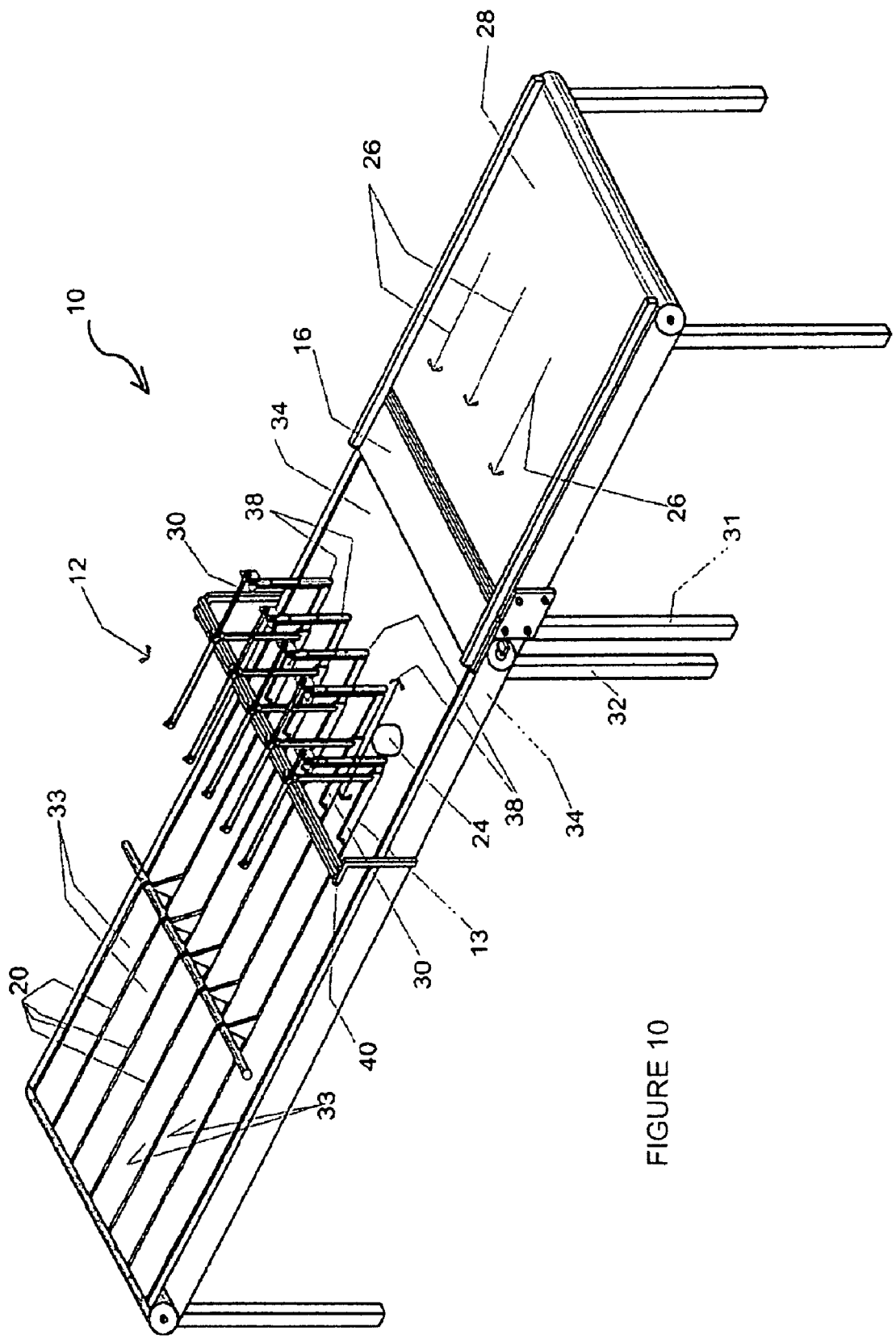
FIG. 10 is a view in perspective of the apparatus of FIG. 1 showing the bakery products being aligned by guiding fingers.
Figure 11:
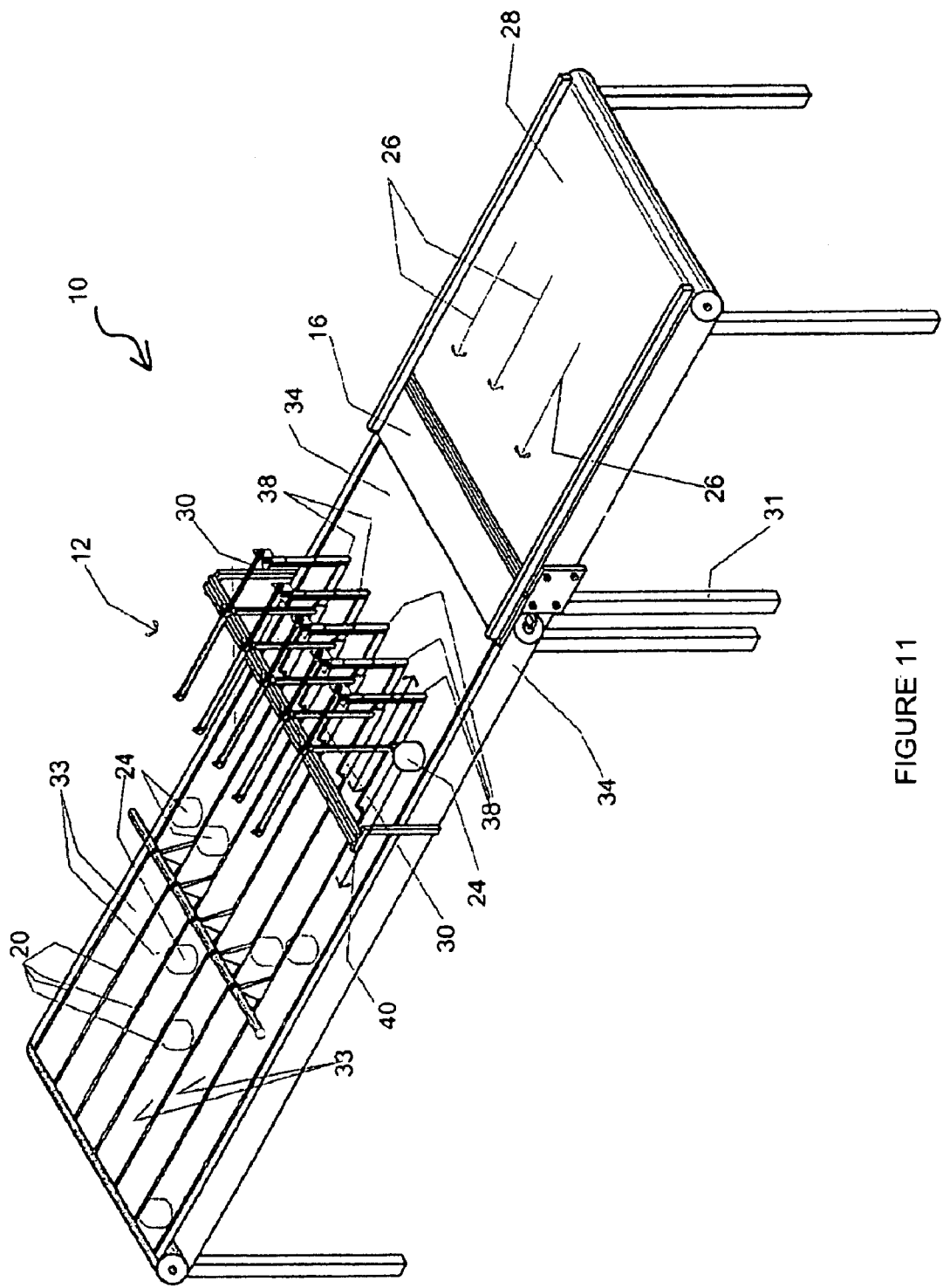
FIG. 11 is a view in perspective of the apparatus of FIG. 1 showing the bakery products aligned into rows by the guiding fingers and being transported by the continuous belt to a subsequent operation of a production process.

FIGS. 1-4 and 8-11 show an apparatus 10 for aligning bakery products 24 (shown, e.g., in FIGS. 8-11), such as rolls or buns. The apparatus 10 includes a first support structure 31 supporting a first continuous belt 28, a second support structure 32 supporting a second continuous belt 34, a distributing plate 16 at an interface between the first and second continuous belts 28 and 34, and an alignment device 12 disposed above the second continuous belt 34.

In operation, the bakery products 24 may be randomly deposited on the first continuous belt 28 and conveyed along the continuous belt 28 in a conveying direction indicated by arrows 26. For example, the bakery products 24 may be randomly deposited on the continuous belt 28 after exiting a previous production stage, such as a baking operation, a sprinkling operation (e.g., after the bakery products have been sprinkled with sesame seeds), etc. The distributing plate 16 is operable to temporarily halt or delay movement of the bakery products 24 in the conveying direction and thereafter periodically release the bakery products 24 onto the second continuous belt 34. The distributing plate 16 is articulated in a continuously alternating fore and aft movement in a direction transverse to the conveying direction of the continuous belt 28, temporarily delaying movement of the bakery products 24 along the apparatus 10. As a result, a plurality of the bakery products 24 cluster together at the distributing plate 16. A portion of the clustered bakery products 24 are then periodically released onto the second continuous belt 34 by the alternating fore and aft movement of the distributing plate 16. As a result, the distributing plate 16 provides improved distribution of the bakery products 24 on the second continuous belt 34.

Figure 5:
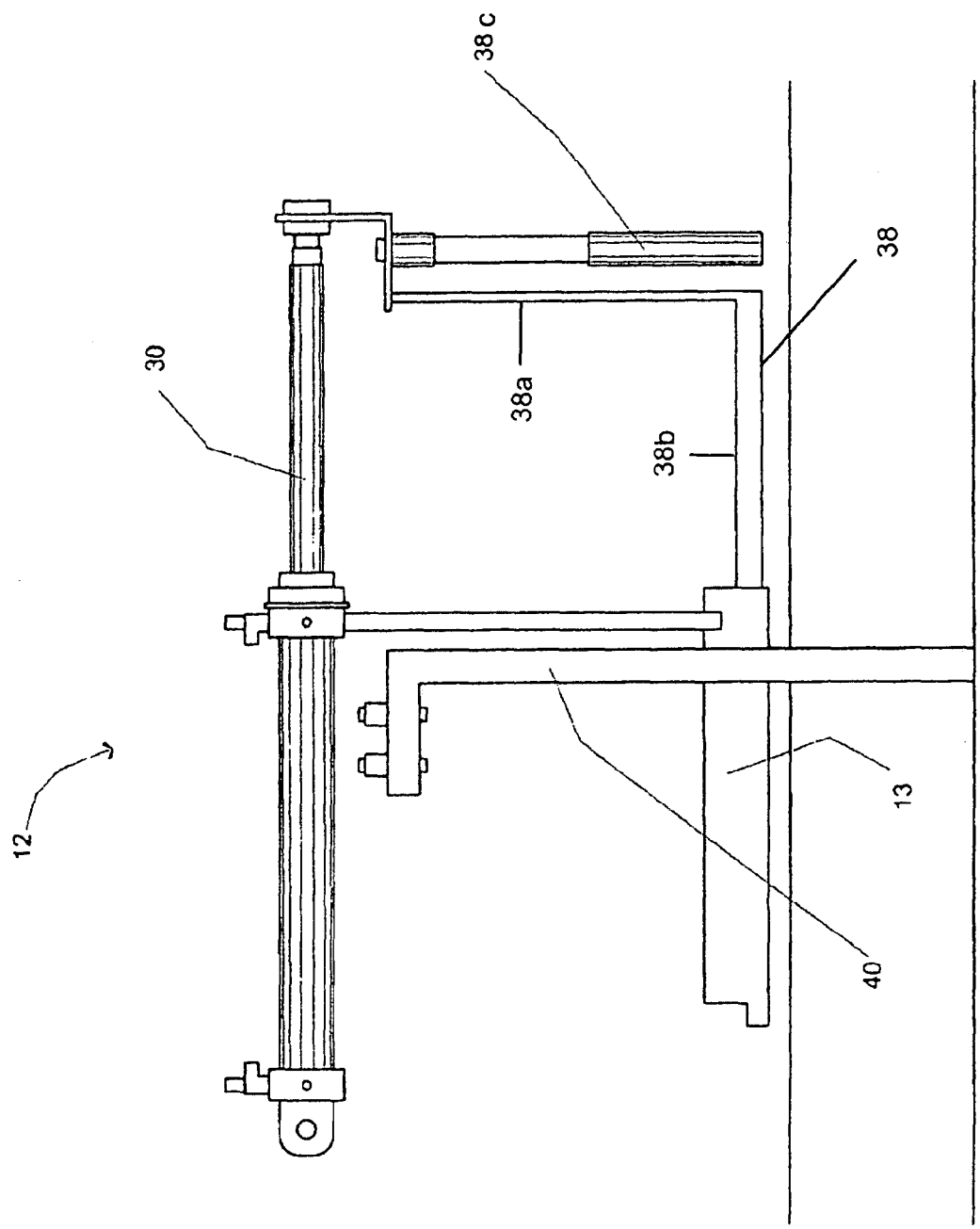
FIG. 5 is a detailed view illustrating an aligning element operable to align randomly placed products disposed on the continuous belt.
Figure 6:
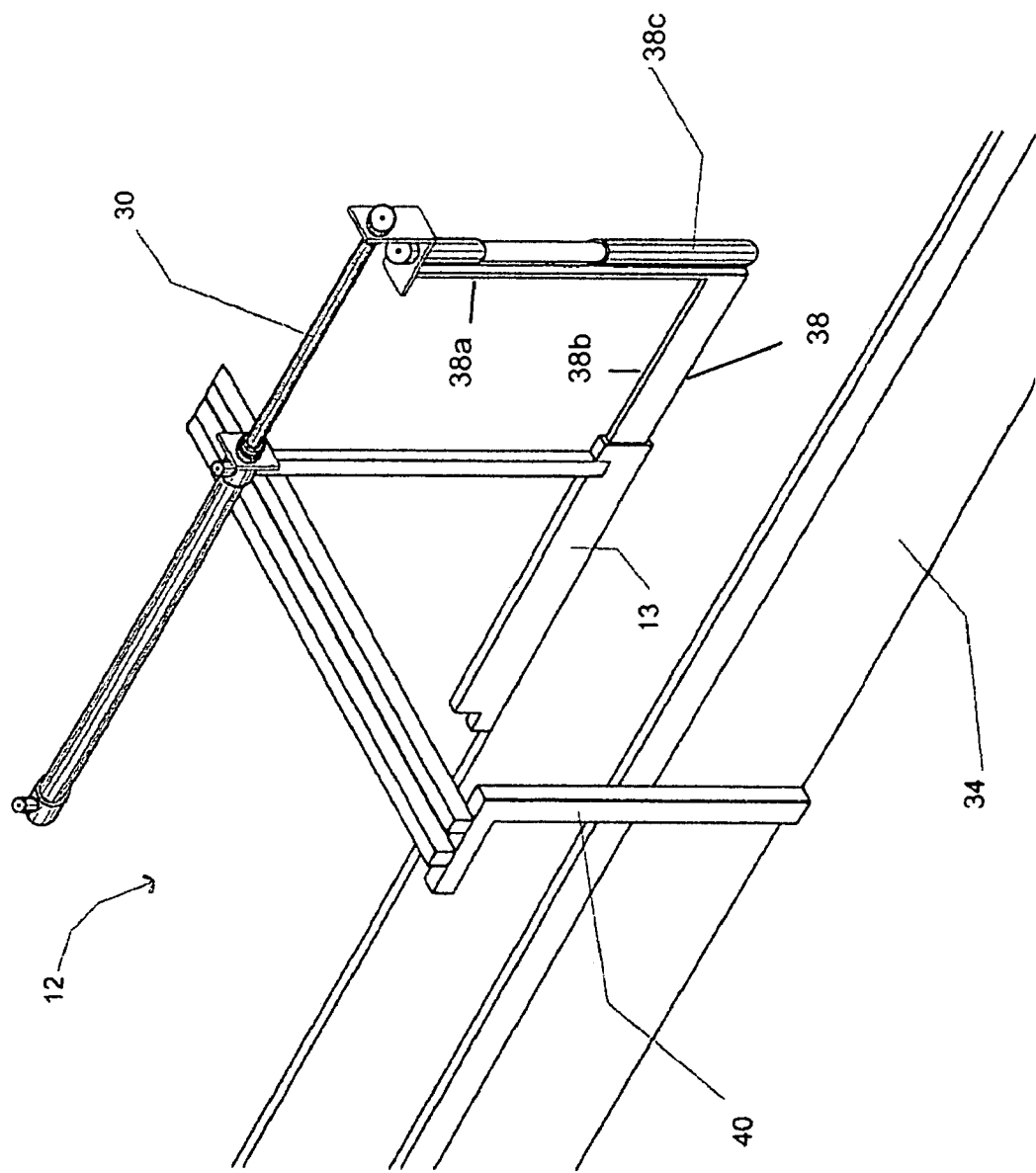
FIG. 6 is a perspective view of the aligning element illustrated in FIG. 5.
Figure 7:
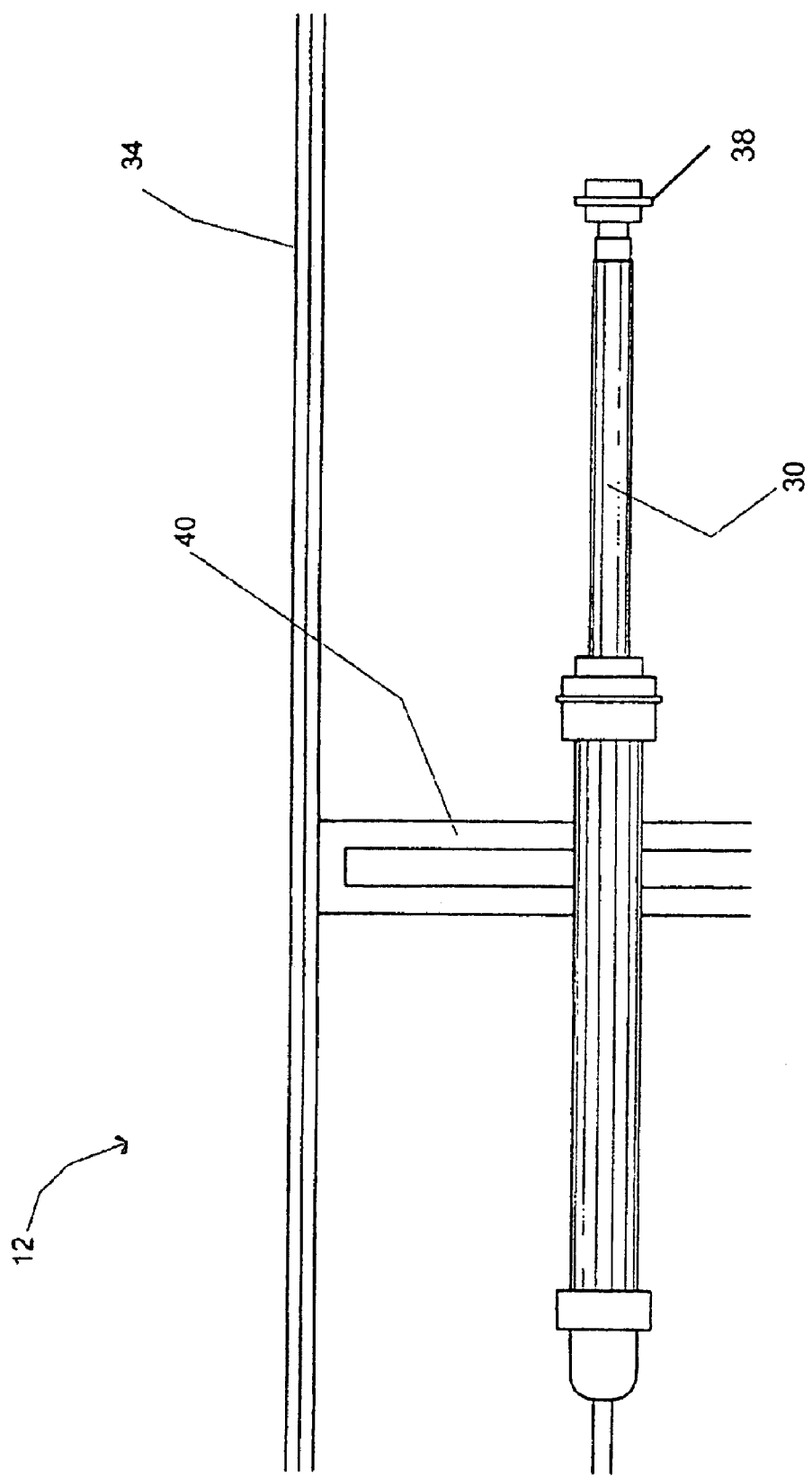
FIG. 7 is a top view of the aligning element illustrated in FIG. 5.

Referring to FIGS. 1 and 5-7, the alignment device 12 includes a support structure 40, a plurality of guiding fingers 38 at a first end of the alignment device 12, a plurality of pistons 30 for actuating the guiding fingers 38, and a plurality of partitions 20 extending longitudinally above the continuous belt 34 in a direction parallel to the conveying direction thereof. Each guiding finger 38 includes a first portion 38a disposed vertically, a second portion 38b disposed horizontally and parallel to the conveying direction, and a roller 38c disposed upstream of the first portion 38a and rotatably attached to each of the guiding fingers 38. The second portion 38b of the guiding finger 38 is slideable within a guide 13 of the support structure 40. Thus, as the pistons 30 extend and retract, the second portion 38b of the guiding finger 38 extends and retracts in a direction substantially parallel with the conveying direction of the second continuous belt 34. Further, the pistons 30 operate independently of each other so that the guiding fingers 38 are extended and retracted in synchronicity. Consequently, while one or more pistons 30 may be extending their respective second portion 38b of guiding fingers 38, one or more other pistons 30 may be retracting their respective second portion 38b of guiding fingers 38. The partitions 20 define channels 33 above second continuous belt 34 that operate to align the bakery products 24 traveling therealong. The alignment device 12 is, therefore, operable to separate the bakery products 24 distributed on the second continuous belt 34 into a plurality of rows within the channels 33. The apparatus 10 may be provided to separate a plurality of bakery products 24 into a plurality of rows prior to advancing the bakery products 24 to a subsequent operation.

As explained above, the guiding fingers 38 are operated independently of each other. Particularly, as one of the guiding fingers 38 is extended, another of the guiding fingers 38 is retracted. Thus, in operation, the guiding fingers 38 are in different stages of being extended and retracted. Further, as the guiding fingers 38 are being operated (e.g., in three sequential impulses), the guiding fingers 38 impact one or more of the bakery products 24 such as when the guiding fingers 38 are being extended or retracted. This impact laterally can displace the bakery products 24 on the second continuous belt 34 causing the bakery products 24 to enter one of the channels 33. Thus, the apparatus 10 is operable to align the bakery products 24 on the second continuous belt 34 into a plurality of rows.

The alignment device 12 may define a sufficient number of channels 33 to define a number of rows of bakery products 24 required by a subsequent processing operation. An operational rate of the first and second continuous belts 28, 34 and the alignment device 12 is controlled to provide a continuous, unobstructed flow of bakery products 24 from a previous processing operation to a subsequent processing operation. Thus, operation of the apparatus 10 may be controlled to provide a continuous flow of bakery products through the bakery products' 24 production process. Accordingly, the operational rate of the continuous belts 28 and 34, the motion or the distributing plate 16, the motion of the guiding fingers 38, as well as a processing speed of a processing operation following alignment of the bakery products 24 by the apparatus 10 can be synchronized. To provide synchronization control, a process controller may also be used.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus for aligning a plurality of food products into a plurality of rows comprises:
   a first continuous belt conveyor;
   a second continuous belt conveyor adjacent the first continuous belt conveyor;
   a dispersal plate at a junction of the first continuous belt conveyor and the second continuous belt conveyor, the dispersal plate being articulable in opposing directions transverse to a conveying direction of the first continuous belt conveyor;
   an alignment apparatus disposed above the second continuous belt conveyor comprising:
      a plurality of longitudinal partitions extending along a portion of and substantially aligned with a conveying direction of the second continuous belt conveyor, the plurality of longitudinal partitions forming a plurality of channels above the second continuous belt conveyor;
      a plurality of guiding fingers disposed at a first end of the alignment apparatus, each guiding finger comprising a first portion disposed vertically and a second portion disposed horizontally and parallel to the conveying directions; and
      a plurality of actuators, each of the actuators coupled to a proximal end of the first portion of each respecting guide finger and operable to extend and retract the respective guide finger.

2. The apparatus of claim 1, wherein the plurality of guiding fingers are extendable in a direction opposite the conveying direction of the second continuous belt conveyor and retractable in a direction aligned with the conveying direction of the second continuous belt conveyor in the conveying direction.

3. The apparatus of claim 1, wherein the plurality of actuators are actuatable pistons.

4. The apparatus of claim 1, wherein the alignment device further comprises a support structure comprising a plurality of guides, wherein the second portion of each of the plurality of guide fingers is slideable within a corresponding guide of the plurality of guides, and wherein each of the plurality of actuators is attached at a first end to the support structure and at a second end to the first portion of the respective guide finger.

5. The apparatus of claim 1, wherein each of the guide fingers of the plurality of guide fingers is aligned with a corresponding longitudinal partition of the plurality of longitudinal partitions.

6. The apparatus of claim 1, wherein the dispersion plate extends above a portion of the second continuous belt conveyor and is articulable in opposing directions transverse to the conveying direction of the first continuous belt conveyor.

7. The apparatus of claim 1, wherein each of the plurality of guiding fingers further comprises a roller disposed upstream in the conveying direction of the first portion of each guiding finger and each of the rollers is rotatably attached to each of the guiding fingers.

8. The apparatus of claim 7 further comprising a controller operable to synchronize operation of the first continuous belt, the dispersal plate, the second continuous belt, and the guiding fingers to provide a continuous flow of food products such that an outflow of food products from the apparatus is substantially the same as an inflow of food products to the apparatus.

9. The apparatus of claim 8, wherein the controller is operable to control at least one of a conveying speed of the first continuous belt, and operational speed of the dispersal plate, a conveying speed of the second continuous belt, or an extension and retraction of each of the guiding fingers.

10. A method for segregating a plurality of food products into rows, the method comprising:
   receiving a plurality of food products at a first location;
   conveying the plurality of food products to a second location in a conveying direction;
   oscillating a distributing plate in a first direction and a second direction opposite the first direction, the first direction being substantially transverse to the conveying direction, and the second direction being substantially parallel to the conveying direction;
   engaging a portion of the food products with the distributing plate to cluster the food products at the second location and delay movement of the food products in the conveying direction;
   periodically dispensing a portion of the clustered food products to a third location to disperse the food products;
   segregating the dispersed food products into a plurality of longitudinal rows; and transporting the rows of food products to a subsequent processing operation.

11. The method of claim 10, wherein receiving a plurality of food products at a first location comprises depositing the plurality of food products onto a first continuous belt conveyor.

12. The method of claim 11, wherein conveying the plurality of food products to a second conveyor comprises transporting the plurality of food products along the first continuous belt conveyor to a distributing plate disposed near an end of the first continuous belt conveyor.

13. The method of claim 12, wherein segregating the dispersed food products into a plurality of longitudinal rows comprises:
  providing an apparatus with channels extending along a length of the second continuous belt conveyor;
  providing a plurality of guiding fingers;
  engaging the dispersed food products with the plurality of guiding fingers; and
  deflecting the dispersed products with the plurality of guiding fingers into the channels to form rows of food products within the channels.

14. The method of claim 13, wherein engaging the dispersed food products with a plurality of guiding fingers comprises:
  articulating the plurality of guiding fingers along a path between an extended position and a retracted position, the path being substantially aligned with a conveying direction of the second continuous belt conveyor; and
  contacting the articulating guiding fingers with the dispersed food products being conveyed along the second continuous belt conveyor.

15. The method of claim 10, wherein periodically dispensing a portion of the clustered food products to a third location to disperse the food products comprises:
  periodically depositing a portion of the clustered food products from the dispensing plate onto a second continuous belt conveyor; and
  continuously conveying the periodically deposited food products on the second continuous belt conveyor to form a dispersed population of food products thereon.

16. The method of claim 10, wherein the number of longitudinal rows corresponds to a number of rows of food products required by the subsequent processing operation.

17. An apparatus for segregating food products into a plurality of longitudinal rows in a production process comprises:
  a first continuous belt conveyor operable to convey in a first direction;
  a second continuous belt conveyor adjacent the first continuous belt conveyor operable to convey in a second direction;
  a dispensing plate provided at an interface between the first continuous belt conveyor and the second continuous belt conveyor, the dispensing plate articulable in a back-and-forth motion transverse to at least one of the first conveying direction or the second conveying direction;
  an alignment apparatus comprising:
    a plurality of longitudinal members aligned with the second conveying direction, the plurality of longitudinal members forming channels for receiving the food products therein;
    a plurality of articulable guiding fingers disposed at a first end of the alignment apparatus, each guiding finger aligned with a corresponding longitudinal member;
    a plurality of guide members, each of the guiding fingers slideable within a corresponding guide member; and
    a plurality of piston-type actuators coupled to respective guide members to articulate the guide members in a back-and-forth movement aligned with the second conveying direction.

18. The apparatus of claim 17, wherein the plurality of guiding members are arranged in groups, wherein each group of guiding members articulate in unison, and wherein different groups of guiding members articulate separately from each other.

19. The apparatus of claim 17, wherein each of the plurality of articulable guiding fingers further comprises a roller disposed upstream in the second conveying direction, each roller being rotatably attached to each of the guiding fingers.

20. The apparatus of claim 17 further comprising a controller operable to synchronize operation of the first continuous belt, the second continuous belt, the dispersal plate, and the alignment apparatus to provide a continuous flow of food products such that an outflow of food products from the apparatus is substantially the same as an inflow of food products to the apparatus.

21. The apparatus of claim 20, wherein the controller is operable to control at least one of a conveying speed of the first continuous belt, a conveying speed of the second continuous belt, and operational speed of the dispersal plate, or an extension and retraction of the plurality of articulable guiding fingers.

22. The apparatus of claim 17, wherein each of the plurality of articulable guiding fingers is adjustable in a transverse direction to the second conveying direction.

* * * * *